United States Patent
Foley

(10) Patent No.: US 10,409,527 B1
(45) Date of Patent: Sep. 10, 2019

(54) METHOD AND APPARATUS FOR RAID VIRTUAL POOLING

(71) Applicant: EMC IP Holding Company LLC, Hopkinton, MA (US)

(72) Inventor: Todd M. Foley, Waltham, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 89 days.

(21) Appl. No.: 13/729,391

(22) Filed: Dec. 28, 2012

(51) Int. Cl.
G06F 3/06 (2006.01)
G06F 12/0802 (2016.01)
G06F 12/14 (2006.01)

(52) U.S. Cl.
CPC ........ *G06F 3/0689* (2013.01); *G06F 12/0802* (2013.01); *G06F 12/14* (2013.01)

(58) Field of Classification Search
CPC .......... G06F 3/06; G06F 11/10; G06F 3/0689; G06F 12/0802; G06F 12/14; H05K 999/99
USPC ...................................... 711/1–221
See application file for complete search history.

(56) References Cited

U.S. PATENT DOCUMENTS

| | | | | |
|---|---|---|---|---|
| 5,745,915 A * | 4/1998 | Cooper | ............... | G06F 3/061 |
| | | | | 711/114 |
| 7,747,584 B1 * | 6/2010 | Jernigan, IV | ............... | 707/692 |
| 8,694,724 B1 * | 4/2014 | Linnell | ............... | G06F 11/2082 |
| | | | | 711/113 |
| 2003/0126132 A1 * | 7/2003 | Kavuri et al. | ............... | 707/10 |
| 2004/0098538 A1 * | 5/2004 | Horn | ............... | G06F 3/0611 |
| | | | | 711/113 |
| 2006/0053147 A1 * | 3/2006 | Wahlert et al. | ............... | 707/102 |
| 2007/0233868 A1 * | 10/2007 | Tyrrell et al. | ............... | 709/226 |
| 2007/0288699 A1 * | 12/2007 | Wang et al. | ............... | 711/143 |
| 2009/0235269 A1 * | 9/2009 | Nakajima et al. | ............... | 718/104 |
| 2010/0030960 A1 * | 2/2010 | Kamalavannan | ... | G06F 11/1076 |
| | | | | 711/114 |
| 2011/0138102 A1 * | 6/2011 | Glikson et al. | ............... | 711/6 |
| 2011/0225374 A1 * | 9/2011 | Kalos et al. | ............... | 711/149 |
| 2011/0320682 A1 * | 12/2011 | McDougall | ............... | G06F 12/023 |
| | | | | 711/6 |
| 2012/0023290 A1 * | 1/2012 | Sugimoto | ............... | G06F 3/0607 |
| | | | | 711/114 |
| 2012/0047346 A1 * | 2/2012 | Kawaguchi | ............... | G06F 3/0605 |
| | | | | 711/165 |
| 2012/0226935 A1 * | 9/2012 | Kishore | ............... | G06F 11/2094 |
| | | | | 714/6.23 |
| 2012/0265932 A1 * | 10/2012 | Jibbe | ............... | G06F 3/0604 |
| | | | | 711/114 |

(Continued)

OTHER PUBLICATIONS

Lowe, Scott. "Calculate IOPS in a storage array". Published on TechRepublic.com on Feb. 12, 2010. Available at <http://www.techrepublic.com/blog/the-enterprise-cloud/calculate-iops-in-a-storage-array/>.*

*Primary Examiner* — Ann J Lo
*Assistant Examiner* — Jane Wei
(74) *Attorney, Agent, or Firm* — Daly, Crowley Mofford & Durkee, LLP

(57) ABSTRACT

Example embodiments of the present invention provide a method, an apparatus, and a computer program product for providing protection storage in the storage environment to protect production storage. The method includes decoupling data protection of a storage environment from physical characteristics of protected storage in the storage environment and providing protection storage in the storage environment to protect production storage.

19 Claims, 4 Drawing Sheets

(56) References Cited

U.S. PATENT DOCUMENTS

2013/0268497 A1* 10/2013 Baldwin ........... G06F 17/30159
707/692

* cited by examiner

METHOD AND APPARATUS FOR RAID VIRTUAL POOLING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

RAID schemes have provided varying levels of redundancy for digital data on storage media for decades. Traditional and common RAID schemes all require additional capacity beyond the primary data capacity in order to maintain an online recoverable copy of the data in the event of primary source media failure. This benefit of protection comes at a cost. RAID schemes typically also represent additional performance overhead, as the data must be written to multiple times instead of just once. In addition to the increased write workload, latency may be increased due to the need to wait for these multiple writes to be completed and acknowledged before data commit and protection is assured.

Modern storage arrays utilize cache to mitigate this "write penalty," but performance is impacted when cache is heavily utilized and write destaging needs to occur. Additionally, total write cache is commonly shared for all writes—both primary target and RAID protection—so that cache size must be increased in sizing and design to compensate for RAID utilization to avoid the impact of premature write destaging on production IO. Improper stripe alignment can aggravate RAID overhead and significantly increase IO as well. RAID schemes represent some amount of compromise between protection, usable capacity, and performance. These compromises commonly result in significant increased cost outlay when RAID is utilized for increased data protection. This cost comes from the need for additional capacity for parity or mirroring, as opposed to merely using RAID 0, which does not provide an increase in protection.

The RAID scheme chosen may determine the amount of protection and performance provided, with different schemes having varying characteristics around: amount of additional raw storage capacity required and resulting reduction of the usable percentage of overall storage, write penalties impacting performance, performance during a media failure, ability to withstand multiple media failures, time required to rebuild RAID protection after media failure, and performance impact of rebuilding RAID protection. These characteristics may not be flexibly adjusted to change each individual characteristic separately as desired, as there are dependencies based on the source physical (or virtual) configuration and limitations of each RAID scheme itself.

While certain configurations, such as Isilon storage from EMC Corporation of Hopkinton, Mass., use software protection rather than hardware-based RAID to provide as much as 80% guaranteed usable space, it is common in large storage environments for usable storage to be ~66% of raw storage at best, with many storage architectures resulting in significantly worse usable to raw ratios.

Usable capacity reduction is not simply a result of RAID schemes, though RAID is commonly the primary factor. The method for calculating storage capacity itself (Base-2 conversion) is a factor, as are storage architecture limitations, disk "right-sizing" or simply architectural or environment standards requiring specific sizes for allocation that result in unutilized capacity. Some storage architectures also require "hold back" capacity or present some additional overhead, such as "snapshot reserve" or file system (if utilized) overhead. Additionally, hot spares are commonly provisioned and further reduce usable capacity.

SUMMARY

Example embodiments of the present invention provide a method, an apparatus, and a computer program product for providing protection storage in the storage environment to protect production storage. The method includes decoupling data protection of a storage environment from physical characteristics of protected storage in the storage environment and providing protection storage in the storage environment to protect production storage.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Reduction in usable capacity represents significant cost impact to storage acquisition despite leveraging of advantages in storage efficiency and usable capacity. Example embodiments of the present invention, however, provide significant impact to the usable to raw ratio and significantly change the cost model attributable to overhead by employing virtual provisioning, write caching, and automated storage tiering to address RAID protection inefficiencies and leverage flash memory and deduplication methods to decouple storage configuration of RAID from the storage configuration of the production environment while still providing RAID protection to the production environment.

Figure 1:
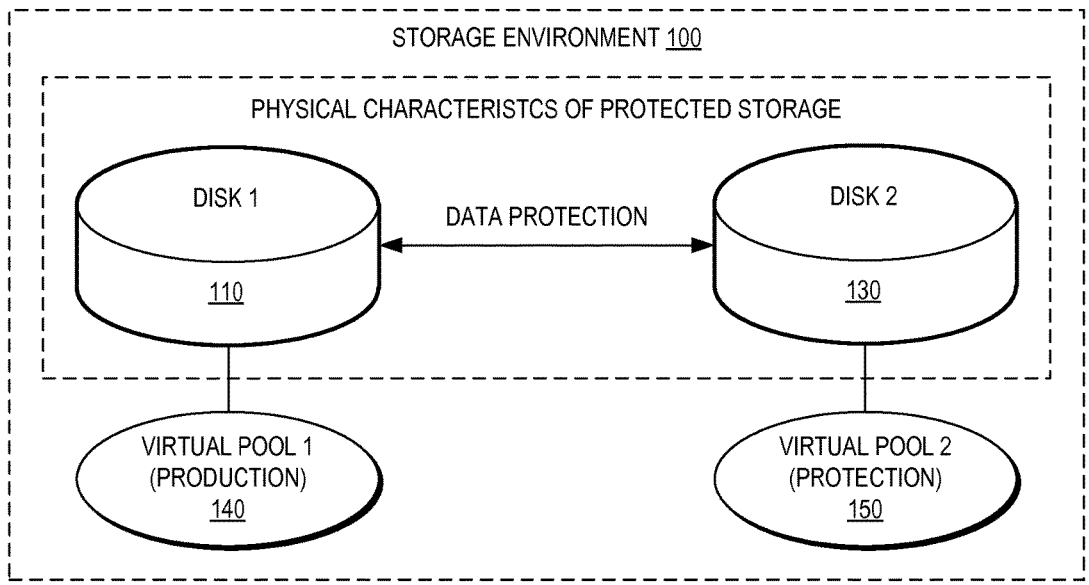
FIG. 1 is a logical block diagram illustrating a storage environment having protection storage to protect production storage decoupled from physical characteristics of the protected storage according to an example embodiment of the present invention.

FIG. 1 is a logical block diagram illustrating a storage environment (i.e., physical and virtual) 100 having protection storage 150 to protect production storage 140 decoupled from physical characteristics of the protected storage 110, 130 according to an example embodiment of the present invention. RAID protection is, by definition, connected to its source. However, by introducing a layer of abstraction by having the RAID, itself, be a virtual pool, the RAID model is changed to remove the tightly-coupled dependency of protection and resources.

Figure 5:
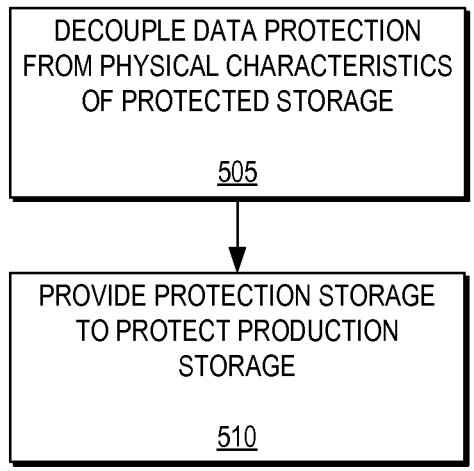
FIGS. 5 and 6 are flow diagrams illustrating example methods according to example embodiments of the present invention.
Figure 6:
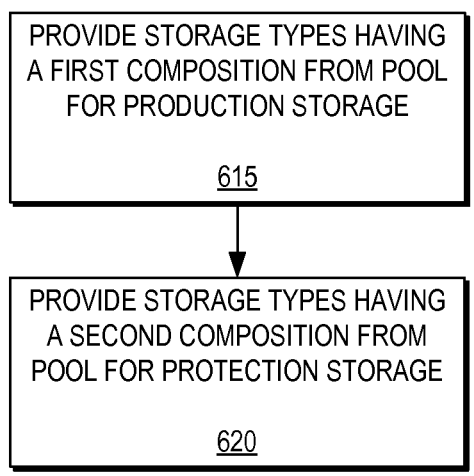

Accordingly, as illustrated in FIG. 1, which may be studied in conjunction with the flow diagrams of FIGS. 5 and 6, example embodiments of the present invention provide abstraction of disk RAID protection from the physical characteristics of the protected storage by decoupling allocated resources for RAID data protection (e.g., disk 1 110 and disk 2 130) from the physical characteristics of the protected storage of production resources (505). Protection storage (e.g., virtual pool 2 150) then may be provided to protect production storage (e.g., virtual pool 1 140) (510). In certain embodiments, as will be discussed in greater detail below, tiered storage, oversubscription and virtual provisioning may be used for the production and protection "RAID pools" 140, 150.

For example, storage types having a first composition from the pool for the production storage may be provided (615) and storage types having a second composition from the pool for the protection storage may be provided (620). Therefore, the "RAID pools" 140,150 may have variant composition from the pool or physical storage 110 used for the source (i.e., primary, production) data. Accordingly, example embodiments of the present invention provide a traditional physical RAID model, with virtual pools shared for production 140 and RAID protection 150.

Example embodiments of the present invention provide additional efficiencies by allowing varying storage compositions between the production 140 and protection virtual pools 150. However, performance of the virtual pool having greater-performance storage would be wasted as it would perform at the performance level of the lower-performance storage pool because of, for example, write latency. High-performant cache (e.g., flash) may offset this performance degradation, as will be described below with respect to FIG. 2.

Further, the use of pools 240, 250 rather than physical allocation can significantly reduce the time on task required for administration. The flexibility of monitoring large pools of storage as opposed to individual allocations is simpler, and the ability to nondisruptively expand pools without downtime represents a significant advantage over older physical approached. Moreover, policy engines and/or rules and triggers may be developed to allow for rules-based allocation of RAID storage to match physical allocations.

Figure 2:
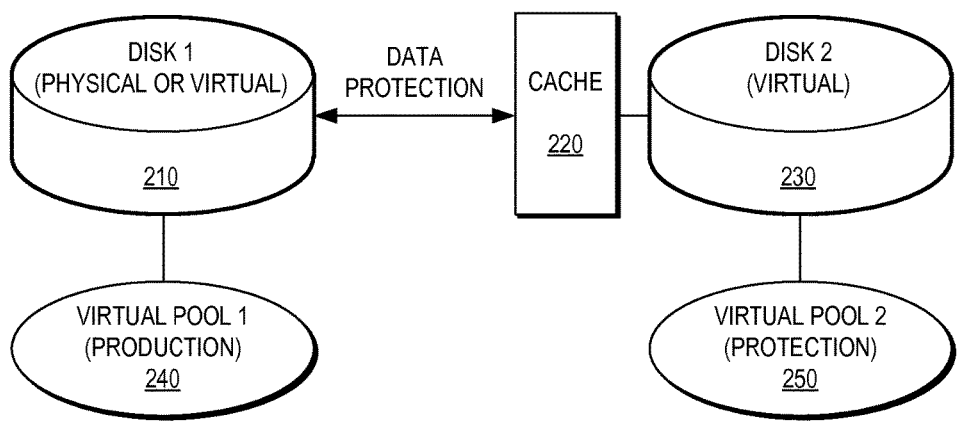
FIG. 2 is a logical block diagram illustrating cache provided in the data protection path in a storage environment having protection storage to protect production storage decoupled from physical characteristics of the protected storage according to an example embodiment of the present invention.

FIG. 2 is a logical block diagram illustrating cache 220 provided in the data protection path in a storage environment having protection storage 250 to protect production storage 240 decoupled from physical characteristics of the protected storage 210, 230 according to an example embodiment of the present invention. The cache 220 may be RAM, SSD, or any other write-performant cache. The cache 220 may provide, in certain embodiments, a dedicated (via hard allocation or dynamic partitioning) "RAID cache" or a physical write "queue" for writes to the "RAID pool" 250, thereby mitigating performance variance between production storage 240 and protection storage 250. Accordingly, the cache 220 may mitigate performance impact of the varying physical characteristics of the protection storage 250 (i.e., cheaper, less-performant storage).

In certain embodiments, deduplication technologies may be used with the protection storage 250 to further improve utilization. For example, as writes come in to cache 220, inline deduplication may be performed as the IOs are written to cache 220. In other embodiments, although less efficient for cache capacity, deduplication may be performed as IOs are offloaded from the cache 220 to the protection storage 250. In yet other embodiments, post processing (e.g., background processing) may be used when the IOs are written to cache 220 or at offload to protection storage 250 to avoid overhead associated with inline deduplication.

Accordingly, example embodiments of the present invention may obtain the benefits of tiered storage and virtual provisioning without using tiered storage or virtual provisioning for primary storage, thereby accelerating and mitigating risk of adoption of newer and more efficient technologies and allowing for use of technologies, such as FAST VP from EMC Corporation of Hopkinton, Mass., for protection storage pools 250. Utilizing virtual provisioning for pools of storage used for protection 250 allows for use of oversubscription for RAID protection because protection RAID pools are isolated from production RAID pools 240. Further, other key attributes of virtual provisioning may be utilized, such as zeroed block/unconsumed storage detection and reclamation of freed pool storage, thereby obtaining significant gains in actual utilization Providing a layer of abstraction between the protected storage 240 and the physical characteristics of the protected storage 210 provides opportunities to increase RAID efficiency by reducing the storage overhead required for RAID. For example, instead of each disk having a mirror or a RAID group as in traditional RAID, example embodiments of the present invention provide unprotected production 240 that then may be mirrored or striped into a RAID pool 250 having different physical characteristics of the production environment. It should be noted that, while most array RAID schemes try to perform IOs with parallel read (i.e., both production and protection) to provide increased performance, in a preferred embodiment, production storage may be isolated for read IO (unless, for example, a failure in primary storage occurs) because the read performance of the production and protection storage will be different, thereby causing performance problems of the system.

Allowing for storage availability and protection 210, 230 to be configured flexibly and separately from storage performance 240, 250 provides significant benefits by enabling alignment of business requirements with technology in reducing cost and gaining flexibility while maintaining primary performance. For example, in disaster recovery environments, protection storage may be chosen with lower availability or performance capabilities than production storage and configured to reduce cost of disaster recovery. Further, local replication, such as TimeFinder from EMC Corporation of Hopkinton, Mass., may be increasingly adopted.

Figure 3:
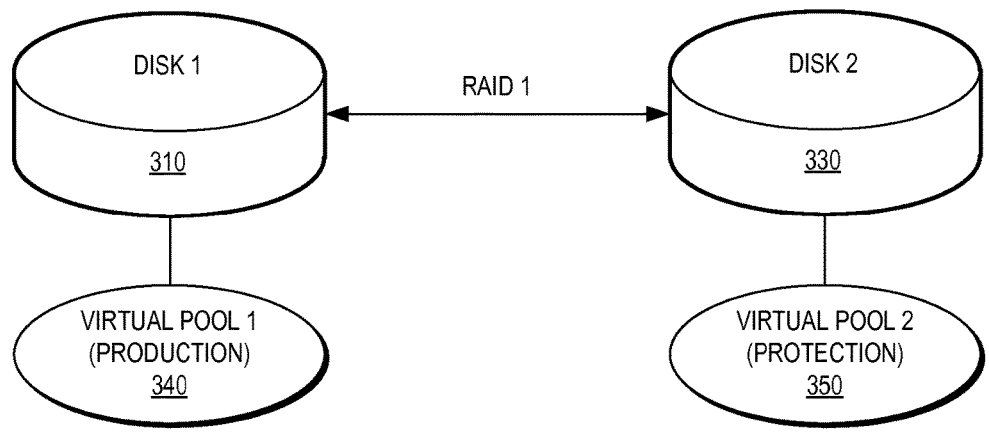
FIGS. 3 and 4 are logical block diagrams illustrating the use of RAID 1 and RAID 5/6, respectively, in a storage environment having protection storage to protect production storage decoupled from physical characteristics of the protected storage according to an example embodiment of the present invention.
Figure 4:
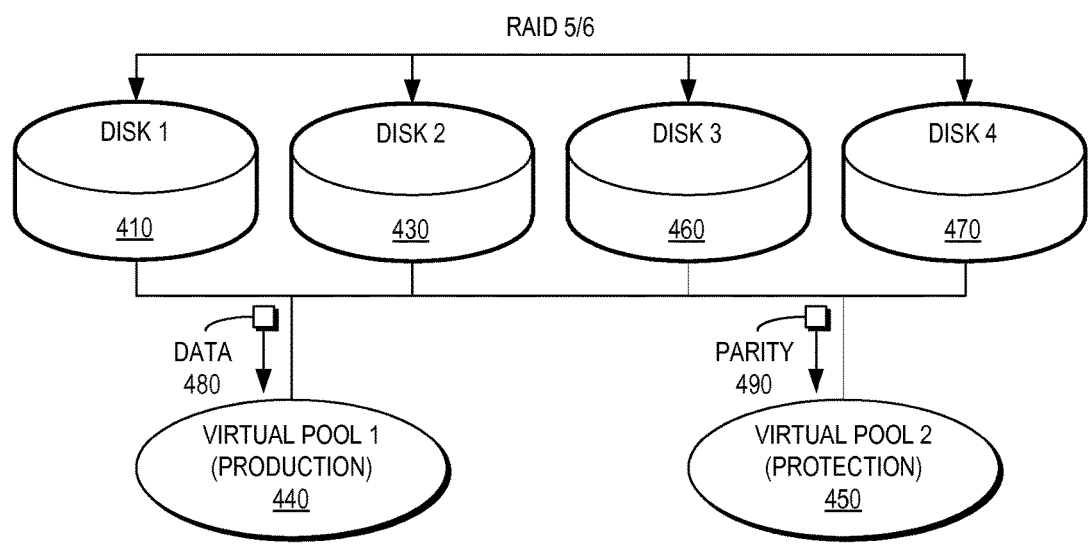

FIGS. 3 and 4 are logical block diagrams illustrating the use of RAID 1 and RAID 5/6, respectively, in a storage environment having protection storage 350, 450 to protect production storage 340, 440 decoupled from physical characteristics 310, 410, 430, 460, 470 of the protected storage according to an example embodiment of the present invention. Certain embodiments of the present invention have the ability to configure (i.e. allow, adjust or "turn off") use of RAID. Isolation of the production storage and allowing for different physical characteristics of the production storage and the protection storage provides additional flexibility for all RAID schemes. Further, decoupling of RAID protection from primary storage allocation allows for not only variance in tier, but variance in protection schemes. For example, the RAID pool may be configured to have its own RAID protection, and in doing so use a varying RAID value from the protection scheme used to protect the production environment. This would increase protection by improving resiliency to failure (e.g., if the production primary storage were "mirrored" to the RAID pool, and the RAID pool was itself utilizing a RAID-6 protection scheme, then multiple drive failures would not halt access to or lose data).

As illustrated in FIG. 3, RAID 1 may be deployed as a data protection scheme between a production disk 310 and a protection disk 330. Accordingly, abstraction of disk RAID 1 protection from the physical characteristics of the protected storage may be provided by decoupling allocated resources for RAID 1 data protection (e.g., production disk 110 and protection disk 130) from the physical characteristics of the protected storage of production resources. Protection storage (e.g., virtual pool 2 150) then may be provided to protect production storage (e.g., virtual pool 1 140) (510).

Likewise, as illustrated in FIG. 4, RAID 5/6 may be deployed as a data protection scheme between a plurality of production disks 410, 430, 460, 470. Accordingly, abstraction of disk RAID 5/6 protection from the physical characteristics of the protected storage may be provided by decoupling allocated resources for RAID 5/6 data protection (e.g., production disks 410, 430, 460, 470) from the physical characteristics of the protected storage of production resources. Protection storage (e.g., virtual pool 2 450) (i.e., storing parity data 490) then may be provided to protect production storage (e.g., virtual pool 1 440) (i.e., storing data 480). In order to provide isolation of the production data, the IO patterns of traditional RAID may require modification to prevent read/write IOs from the parity drives. Accordingly, parity data may be stored to a separate virtual pool. For example, production data may be stored to higher-performant disks with parity data being written to lower-performant disks. It should be understood that cache also may be used in this example embodiment to increase the performance of parity IOs.

Isolation of production primary storage IO from RAID pool IO allows for use of space-efficient (e.g., pointer based snapshot, deduplicated copies) copies of data to be made from the protected RAID pool rather than the primary production source storage. This provides for much greater efficiencies in utilization for copies made for the purposes of production backup offload, Point-in-Time (PIT) recovery from corruption or deletion, and Application Lifecycle Management refresh of non-production environments (e.g., Quality Assurance, Development, Sandbox, Performance Testing, Production Support, Training, etc.).

Further, abstraction of RAID protection from the source storage may enable the RAID pool itself to be extended to journal rather than merely match writes that occur on the primary production storage. This provides for greater utilization through use of the RAID pool for both protection and Continuous Data Protection (CDP) replica, requiring only the addition of journal capacity to offer CDP capabilities. Array snapshots could be taken of any PIT provided in the journal/RAID protection combination supporting additional use, offering much greater granularity of PIT selection in doing so. For example, RecoverPoint from EMC Corporation of Hopkinton, Mass. provides a replica volume of a production volume. Traditionally, RecoverPoint has a production volume and a splitter to split write IOs to a journal. Every so often, RecoverPoint may apply the journal data to a replica volume to provide a full copy of the production volume. In an example embodiment of the present invention, if the protection storage is used as a RecoverPoint replica, the only additional overhead necessary for a RecoverPoint implementation is the journal of IO transactions (i.e., there is a greater efficiency in the overall protection scheme because no more protection copy is required). Further, pointers may be leveraged to provide for snapshots to roll the replica forward and back in time.

It should be noted that a performance disadvantage that example embodiments of the present invention share with some other RAID schemes is the performance during protection rebuild if the primary production source fails. In such a situation, data would be read and written to directly from production to the RAID pool. In cases where the production primary storage was more performant than the RAID pool itself, this would result in a traditional rebuild impact to performance. The extent and length of that impact, however, may be flexibly controlled by policy and mitigated in part by technical approaches to the "rebuild" activity. For example, rebuild to a hot spare or even to a high tier allocation in the RAID pool itself may be prioritized based on policy defined at time of initial allocation (e.g., "profiles" for RAID rebuild within a pool, or perhaps manual or policy-driven selection of RAID allocation from varying RAID pools). Further, the rebuild may be performed to cache before a background rebuild to a hot spare occurs. Moreover, "Copy on First Access" algorithms or "Instant Protected Restore" approaches may optimize IO as rebuild progresses and facilitate final cutover.

Figure 7:
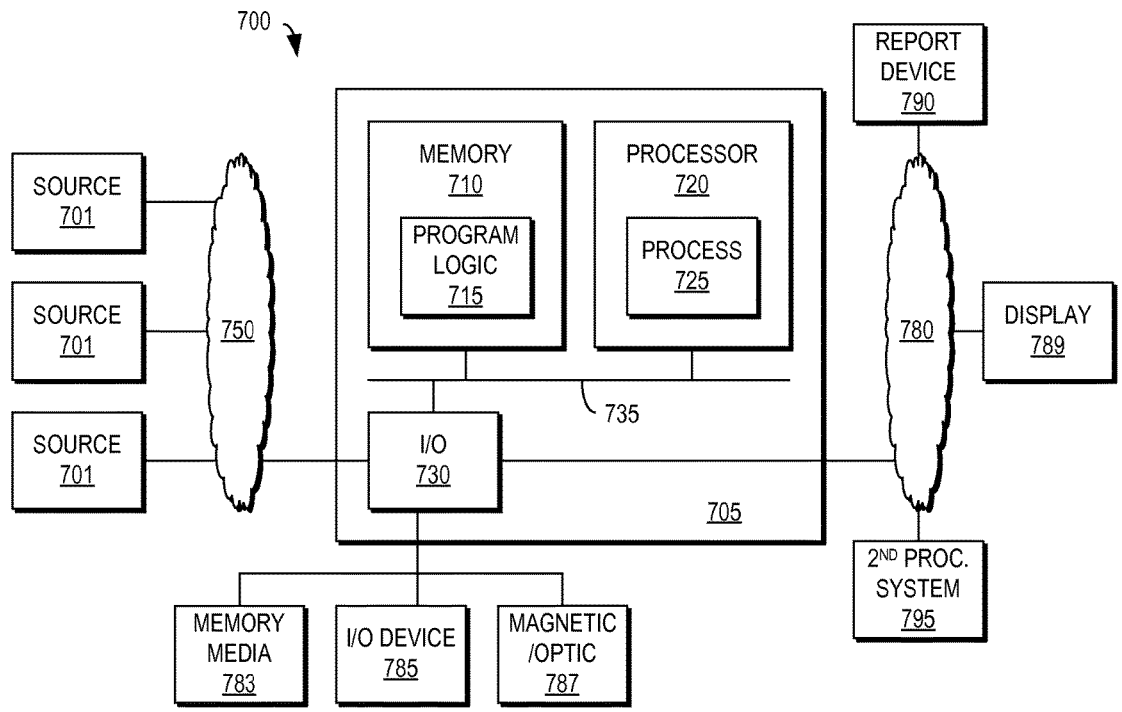
FIG. 7 is a block diagram illustrating an apparatus according to an example embodiment of the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 8:
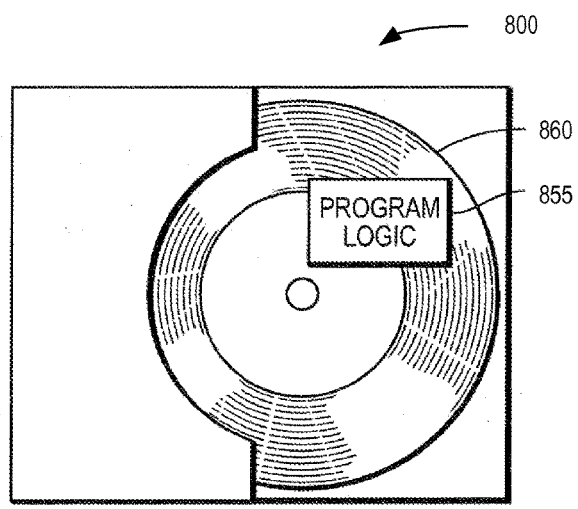
FIG. 8 is an illustration of an apparatus as embodied in program code according to an example embodiment of the present invention.

FIG. 8 shows program logic 855 embodied on a computer-readable medium 860 as shown, and wherein the logic 855 is encoded in computer-executable code configured for carrying out the gas controlling process of this invention, thereby forming a computer program product 800.

The logic for carrying out the method may be embodied as part of the aforementioned system, which is useful for carrying out a method described with reference to embodiments shown in, for example, FIGS. 1-3. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method of decoupling physical characteristics of protected storage in a storage environment comprising:
    providing a data protection scheme requiring tight coupling between resources allocated for the data protection scheme and physical characteristics of a plurality of physical storage resources among which the data protection scheme is provided;
    providing a first set of physical storage resources having a first set of physical characteristics, and a second set of physical storage resources having a second set of physical characteristics different than the first set of physical characteristics;
    providing a cache in a data path over which the data protection scheme is provided between the first set of physical storage resources and the second set of physical storage resources;
    providing a virtual pool of storage resources comprising the first set of physical storage resources and the second set of physical storage resources protected by the data protection scheme, the providing of the virtual pool including providing a rebuild profile for a RAID rebuild within the virtual pool, the rebuild profile prioritizing a rebuild destination, the rebuild profile being provided at a time of initial allocation of the virtual pool;
    providing a first virtual pool of production storage and a second virtual pool of protection storage from the provided virtual pool of storage resources, the first virtual pool being isolated from the second virtual pool, the first virtual pool and the second virtual pool being configured to operate in a RAID 5 or RAID 6 mode, and the second virtual pool being configured to store parity data for the first virtual pool;
    providing a data protection, based on the data protection scheme, between the first virtual pool of production storage and the second virtual pool of protection storage according to: (i) the data protection among the first set of physical storage resources, (ii) the second set of physical storage resources, and (iii) the cache; and
    detecting a failure in the first set of physical storage resources and performing a protection rebuild in response,
    wherein performing the protection rebuild includes: (i) performing an initial rebuild to the cache, and (ii) performing a background rebuild to the rebuild destination that is prioritized by the rebuild profile, the background rebuild being performed after the initial rebuild is completed, and
    wherein providing data protection between the first virtual pool of production storage and the second virtual pool of protection storage comprises providing a layer of abstraction between the data protection and the physical characteristics of the plurality of physical storage resources among which the data protection scheme is provided, the layer of abstraction configured to decouple the tight coupling between resources allocated for the data protection scheme and the physical characteristics of the plurality of physical storage resources, the decoupling comprising isolating the protection storage from the production storage.

2. The method of claim 1 wherein providing a first virtual pool of production storage and a second virtual pool of production storage from the provided virtual pool of storage resources comprises providing the first virtual pool of production storage and the second virtual pool of protection storage from tiered storage.

3. The method of claim 1 wherein providing a first virtual pool of production storage and a second virtual pool of protection storage from the provided virtual pool of storage resources comprises:
    providing storage types having a first composition from the virtual pool of storage resources for the production storage; and
    providing storage types having a second composition from the virtual pool of storage resources for the protection storage,
    wherein the first composition differs from the second composition.

4. The method of claim 1 further comprising enabling configuration of the data protection to disable parallel inputs/outputs (IOs).

5. The method of claim 4 wherein enabling configuration of the data protection to disable parallel IOs comprises preventing parallel reads from the production storage and the protection storage.

6. The method of claim 1 further comprising enabling oversubscription of protection storage.

7. The method of claim 1 further comprising enabling deduplication of protection storage.

8. The method of claim 1, wherein providing a layer of abstraction comprises implementing the first and second virtual pools using RAID.

9. The method of claim 1, wherein, the cache is configured to mitigate at least a portion of a performance variance arising from the difference in physical characteristics between the first and second sets of physical storage resources.

10. The method of claim 1, further comprising performing inline deduplication as input/output (I/O) is either written to or offloaded from the cache.

11. The method according to claim 1, wherein deduplication is performed as writes come into the cache and/or as IOs are offloaded from the cache to the second of physical storage resources.

12. The method according to claim 1, wherein data in the first virtual pool of production storage is striped into the second virtual pool of protection storage, wherein the production storage and the protection storage have different performance characteristics.

13. The method according to claim 1, wherein parity data is stored in the second virtual pool of protection storage, wherein the second pool of protection storage has lower performance than the first virtual pool of production storage in which unprotected production data is stored.

14. An apparatus for of decoupling physical characteristics of protected storage in a storage environment comprising:
 a processor; and
 memory storing instructions that, when executed on the processor, cause the apparatus to:
  provide a data protection scheme, requiring tight coupling between resources allocated for the data protection scheme and physical characteristics of a plurality of storage resources among which the data protection is provided;
  provide a first set of physical storage resources having a first set of physical characteristics, and a second set of physical storage resources having a second set of physical characteristics different than the first set of physical characteristics;
  provide a cache in a data path over which the data protection scheme is provided between the first set of physical storage resources and the second set of physical storage resources;
  provide a virtual pool of storage resources comprising the first set of physical storage resources and the second set of physical storage resources protected by the data protection, the providing of the virtual pool including providing a rebuild profile for a RAID rebuild within the virtual pool, the rebuild profile prioritizing a rebuild destination, the rebuild profile being provided at a time of initial allocation of the virtual pool;
  provide a first virtual pool of production storage and a second virtual pool of protection storage from the provided virtual pool of storage resources, the first virtual pool and the second virtual pool being configured to operate in a RAID 5 or RAID 6 mode, the first virtual pool being isolated from the second virtual pool, and the second virtual pool being configured to store parity data for the first virtual pool; and
  provide a data protection, based on the data protection scheme, between the first virtual pool of production storage and the second virtual pool of protection storage according to: (i) the data protection among the first set of physical storage resources, (ii) the second set of physical storage resources, and (iii) the cache; and
  detect a failure in the first set of physical storage resources and perform a protection rebuild in response,
  wherein performing the protection rebuild includes: (i) performing an initial rebuild to the cache, and (ii) performing a background rebuild to the rebuild destination that is prioritized by the rebuild profile, the background rebuild being performed after the initial rebuild is completed, and
  wherein providing data protection between the first virtual pool of production storage and the second virtual pool of protection storage comprises providing a layer of abstraction between the data protection and the physical characteristics of the plurality of physical storage resources among which the data protection scheme is provided, the layer of abstraction configured to decouple the tight coupling between resources allocated for the data protection scheme and the physical characteristics of the plurality of physical storage resources, the decoupling comprising isolating the protection storage from the production storage.

15. The apparatus of claim 14 wherein providing a first virtual pool of production storage and a second virtual pool of production storage from the provided virtual pool of storage resources comprises providing the first virtual pool of production storage and the second virtual pool of protection storage from tiered storage.

16. The apparatus of claim 14 wherein providing a first virtual pool of production storage and a second virtual pool of protection storage from the provided virtual pool of storage resources comprises:
 providing storage types having a first composition from the virtual pool of storage resources for the production storage; and
 providing storage types having a second composition from the virtual pool of storage resources for the protection storage,
 wherein the first composition differs from the second composition.

17. The apparatus of claim 14 wherein the memory further stores instructions that, when executed on the processor, cause the apparatus to prevent parallel reads from the production storage and the protection storage.

18. A computer program product including a non-transitory computer-readable storage medium encoded with computer program code that, when executed on a processor of a computer, causes the computer to decouple data protection of a storage environment from physical characteristics of protected storage in the storage environment, the computer program product comprising:
 computer program code for providing a data protection scheme, requiring tight coupling between resources allocated for the data protection scheme and physical characteristics of a plurality of storage resources among which the data protection is provided,
 computer program code for providing a first set of physical storage resources having a first set of physical characteristics and a second set of physical storage resources having a second set of physical characteristics different than the first set of physical characteristics;
 computer program code for providing a cache in a data path over which the data protection is provided between the first set of physical storage resources and the second set of physical storage resources;
 computer program code for providing a virtual pool of storage resources comprising the first set of physical storage resources and the second set of physical storage resources protected by the data protection, the providing of the virtual pool including providing a rebuild profile for a RAID rebuild within the virtual pool, the rebuild profile prioritizing a rebuild destination, the rebuild profile being provided at a time of initial allocation of the virtual pool;
 computer program code for providing a first virtual pool of production storage and a second virtual pool of protection storage from the provided virtual pool of storage resources, the first virtual pool being isolated from the second virtual pool, the first virtual pool, the first virtual pool and the second virtual pool being configured to operate in a RAID 5 or RAID 6 mode, and the second virtual pool being configured to store parity data for the first virtual pool;
 computer program code for providing a data protection between the first virtual pool of production storage and the second virtual pool of protection storage according to; (i) the data protection among the first set of physical storage resources, (ii) the second set of physical storage resources, and (iii) the cache; and
 computer program code for detecting a failure in the first set of physical storage resources and performing a protection rebuild in response, wherein performing the protection rebuild includes: (i) performing an initial rebuild to the cache, and (ii) performing a background rebuild to the rebuild destination that is prioritized the rebuild profile, the background rebuild being performed after the initial rebuild is completed, and wherein providing data protection between the first virtual pool of production storage and the second virtual pool of protection storage comprises providing a layer of abstraction between the data protection and the physical characteristics of the plurality of physical storage resources among which the data protection scheme is provided, the layer of abstraction configured to decouple the tight coupling between resources allocated for the data protection scheme and the physical characteristics of the plurality of physical storage resources, the decoupling comprising isolating the protection storage from the production storage.

19. The computer program product of claim 18, wherein the data protection scheme requiring tight coupling comprises Redundant Array of Independent Disks (RAID) and wherein providing a layer of abstraction comprises implementing the first and second virtual pools using RAID.

* * * * *